(12) United States Patent
Fujita et al.

(10) Patent No.: US 6,437,816 B1
(45) Date of Patent: *Aug. 20, 2002

(54) LASER EXPOSURE UNIT INCLUDING PLURAL LASER BEAM SOURCES DIFFERING IN WAVELENGTHS

(75) Inventors: Katsushi Fujita; Tsutomu Yoneyama; Masato Doi, all of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,702

(22) Filed: Sep. 8, 2000

Related U.S. Application Data

(62) Division of application No. 09/061,457, filed on Apr. 16, 1998, now Pat. No. 6,141,030.

(30) Foreign Application Priority Data

Apr. 24, 1997 (JP) .............................. 9-107269
Sep. 4, 1997 (JP) .............................. 9-239535

(51) Int. Cl.[7] .......................... B41J 2/455; B41J 27/00
(52) U.S. Cl. .................. 347/233; 347/241; 347/256
(58) Field of Search .......................... 347/233, 241, 347/256; 359/204; 367/232, 233, 237, 239, 241, 247, 255, 256

(56) References Cited

U.S. PATENT DOCUMENTS

| | | | | |
|---|---|---|---|---|
| 4,987,426 A | * | 1/1991 | Ota et al. | 347/253 |
| RE33,931 E | * | 5/1992 | Whitney | 355/53 |
| 5,296,958 A | * | 3/1994 | Roddy et al. | 359/204 |
| 5,373,395 A | | 12/1994 | Adachi | 359/652 |
| 5,557,303 A | | 9/1996 | Agano et al. | 347/234 |
| 5,838,355 A | * | 11/1998 | Narayan et al. | 347/232 |
| 6,141,030 A | * | 10/2000 | Fujita et al. | 347/233 |

FOREIGN PATENT DOCUMENTS

| | | |
|---|---|---|
| EP | 0 250 132 | 12/1987 |
| EP | 0 326 346 | 8/1989 |
| WO | WO 91/06175 | 5/1991 |

OTHER PUBLICATIONS

Patent Abstracts of Japan, vol. 1995, No. 3, Apr. 28, 1995 & JP 06–334818.

* cited by examiner

Primary Examiner—Hai Pham
(74) Attorney, Agent, or Firm—Frishauf, Holtz, Goodman & Chick, P.C.

(57) ABSTRACT

An exposing apparatus is provided with a first laser beam source for being directly modulated in terms of light amount and for emitting a first laser beam having a first wavelength; a second laser beam source for emitting a second laser beam having a second wavelength different from the first wavelength; and an audio-optical modulation element for modulating the second laser beam in terms of light amount.

25 Claims, 13 Drawing Sheets

→ SUB-SCANNING

LASER EXPOSURE UNIT INCLUDING PLURAL LASER BEAM SOURCES DIFFERING IN WAVELENGTHS

This is a division of application Ser. No. 09/061,457 filed Apr. 16, 1998 now U.S. Pat. No. 6,141,030.

BACKGROUND OF THE INVENTION

The present invention relates to a laser exposure unit, and more particularly to a laser exposure unit wherein laser beams of at least two different wavelengths or more scan a recording medium to expose a color image for formation thereof.

As a laser exposure unit to expose a color image for formation thereof, there have been known a unit wherein gas lasers (an argon laser, a helium neon laser and others) for three wavelengths corresponding to B (blue), G (green) and R (red) and an audio-optical modulation element (hereinafter referred to as AOM) are used in combination and a unit having the structure wherein semiconductor lasers for three wavelengths are subjected to direct modulation (internal modulation).

However, an argon laser which is frequently used especially as B light source among gas lasers has had problems that a unit is big in size and is high in cost.

Further, in modulation by means of a conventional AOM, a laser beam emitted from a gas laser has been caused to enter AOM directly. In this case, an exposure speed is restricted by a modulation speed of AOM, which has made it impossible for the exposure speed to be enhanced sufficiently.

On the other hand, if light-sensitive materials sensitive to red wavelength or longer wavelength are used for three layers for C (cyan), M (magenta) and Y (yellow), it is possible to use a relatively inexpensive semiconductor laser for all light sources. However, the light-sensitive material having the aforesaid characteristics is hard to be designed, manufactured and preserved, a price of such light-sensitive material itself is high, which has been a problem. In addition, three wavelengths are close together due to the use of red wavelength and longer wavelength, causing a possibility of occurrence of an interference of adjoining wavelengths, which has been a problem.

The invention has been achieved in view of the problems mentioned above, and its first object is to provide a laser exposure unit which is compact in size and low in cost and which is further capable of exposing a color image stably at high speed.

Next, problems which are related to plural laser beams and are to be solved by the invention will be described as follows.

In an image recording apparatus having therein a light source section where plural laser diodes with the same wavelength are lined up, a beam lining up optical system which lines up laser beams emitted from the plural laser diodes on recording material in the sub-scanning direction, and a moving means which moves the laser beams emitted from the plural laser diodes and the recording material relatively in the main scanning direction, adjustment of intensity of a laser beam has been conducted by controlling an electric current which flows through a laser diode.

However, in the image recording apparatus stated above, both of adjustment to make all laser beams to be in the same intensity and adjustment of exposure intensity for all laser beams emitted from plural laser diodes need to be conducted by controlling an electric current which flows through a laser diode. Though the adjustment to make all laser beams to be in the same intensity does not need to be conducted frequently, shifting of exposure intensity for all laser beans emitted from the plural laser diodes needs to be conducted surely when changing tone reproduction for outputted images and when changing a recording material, which requires frequent adjustment.

However, an electric current flowing through a laser diode and an amount of emitted light are not in a proportional relation, and the relation between an electric current and an amount of emitted light varies depending on each laser diode and the change of the relation is different depending on the passage of time. Therefore, a measuring means which measures beam intensity of each laser beam emitted from each of plural laser diodes has been required to be provided, and it has been necessary to adjust frequently an electric current that flows though each laser diode of plural laser diodes depending on beam intensity of each laser beam measured by the measuring means, when changing tone reproduction of outputted images and changing recording materials, which has been time-consuming.

It has been common that beam intensity of a laser beam from each laser diode is measured by an optical system, and thereby an electric current which flows through each laser diode of plural laser diodes is adjusted.

However, the foregoing has been effective only for adjustment for variation in beam intensity caused by variation of intensity of luminescence of laser diode with the passage of time, and it has been impossible to adjust variation of beam intensity caused by a change in an optical axis.

In the conventional unit, it has been necessary to cause a recording position of a laser beam from each laser diode to agree with the main scanning direction so that the recording position on a recording material may not be deviated. Therefore, accurate adjustment has been necessary for each unit before its installation or after usage thereof for a certain period of time.

The second object of the invention is to solve the problems related to plural beans and thereby to attain the following items. Shifting of exposure intensity for all laser beams emitted from plural laser diodes in the case of changing tone reproduction for outputted images required to be conducted frequently and changing recording materials is made to be carried out in a short period of time in a simple and stable way.

Variation of beam intensity of each laser beam including variation of beam intensity caused not only by variation of luminescence intensity of a laser beam with the passage of time but also by a change in an optical axis is made to be corrected satisfactorily.

SUMMARY OF THE INVENTION

The first object of the invention can be attained by the following structur.

An exposing apparatus comprises
  a first laser beam source for being directly modulated in terms of light amount and for emitting a first laser beam having a first wavelength;
  a second laser beam source for emitting a second laser beam having a second wavelength different from the first wavelength; and
  an audio-optical modulation element for modulating the second laser beam in terms of light amount.

Furthermore, the first object of the invention can be attained by the following preferable structures in Items 1–9.

Item 1

A laser exposure unit wherein laser beams of at least two different wavelengths or more scan a recording medium to expose an image for formation thereof, wherein a laser beam which is modulated in terms of an amount of light by direct modulation and a laser beam which is modulated in terms of an amount of light by an audio-optical modulation element are combined to constitute the unit.

In the constitution mentioned above, image exposure is carried out by a combination of a laser beam which is subjected to direct modulation (internal modulation) and a laser beam which is subjected to external modulation by an audio-optical modulation element (AOM).

Item 2

The laser exposure unit wherein the laser beam which is modulated in terms of an amount of light by the direct modulation is a semiconductor laser and the laser beam which is modulated in terms of an amount of light by the audio-optical modulation element is a gas laser or a solid laser.

In the constitution mentioned above, with regard to the semiconductor laser, light amount modulation corresponding to image signals is carried out by ON and OFF of an electric current which flows through the semiconductor laser, and with regard to output of the gas laser or the solid laser, light amount modulation corresponding to image signals is carried out by the audio-optical modulation element (AOM). As the gas laser mentioned above, it is preferable to use a He—Ne laser, while as the solid laser, it is preferable to use a laser diode (LD) exciting solid laser. Further, it is preferable to employ the structure wherein one of CMY light-sensitive layers is made to a light-sensitive material sensitive to infrared light as a recording medium, and a gas laser or a solid laser is used as a short wavelength light source (G light source) by shifting the light source toward infrared, and a semiconductor laser is used as a light source (R and infrared light source) with two wavelengths other than the aforesaid short wavelength.

Item 3

The laser exposure unit provided with a beam forming optical means which causes a beam form of the semiconductor laser which is modulated in terms of an amount of light by the direct modulation to agree with a beam form of the gas laser or the solid laser which is modulated in terms of an amount of light by the audio-optical modulation element Since a beam form of a gas laser or a solid laser is completely round while that of a semiconductor laser is elliptical generally, a beam form of a semiconductor laser is made to be completely round so that a beam form of each wave may be the same as others.

Item 4

The laser exposure unit wherein there are provided an incident beam diameter reducing means which reduces a diameter of a laser beam entering the audio-optical modulation element and a beam diameter restoring means which restores a diameter of a laser beam emitted from the audio-optical modulation element reduced by the incident beam diameter reducing means to its original diameter.

Since the response speed in the audio-optical modulation element (AOM) is dependent on the beam diameter, a diameter of a laser beam is reduced to improve the response speed before it enters AOM and then the laser beam is caused to enter AOM to be modulated therein, and after that the diameter of the laser beam is restored.

Item 5

The laser exposure unit wherein there is provided an exposure timing adjustment means which synchronizes exposure timing between the laser beam modulated directly and the laser beam modulated in terms of an amount of light by the audio-optical modulation element.

In the aforesaid structure, the means to synchronize exposure timing is provided because a delay is caused in modulation made by AOM compared with direct modulation of a laser beam. To be concrete, it is possible to synchronize exposure timing by shifting a beam position by an amount of the delay stated above, or by delaying modulation data for the direct modulation by an amount of the delay of AOM.

Item 6

The laser exposure unit wherein there is provided a reducing optical means which reduces the laser beam to the desired beam diameter and projects a beam of the reduced diameter on the recording medium as a collimated beam.

In the aforesaid structure, when scanning a recording medium for exposure by reducing a diameter, a collimated beam with the reduced diameter, namely the beam whose diameter does not change regardless of the distance from a lens, is projected on the recording medium.

Item 7

The laser exposure unit structured so that a recording medium is scanned for exposure by plural laser beams for each wavelength and plural laser beams are modulated simultaneously by the audio-optical modulation element, wherein there is provided a pitch changing means which makes an internal of a laser beam modulated in terms of an amount of light by the direct modulation to agree with that of a laser beam in the audio-optical modulation element.

In the aforesaid structure, an interval of a laser beam modulated directly is changed so that the internal of a laser beam modulated directly may agree with that of plural laser beams modulated simultaneously by the audio-optical modulation element, under the structure that a recording medium is scanned for exposure by plural laser beams for each wavelength and plural laser beams are modulated simultaneously by the audio-optical modulation element.

Item 8

The laser exposure unit wherein there is provided a pitch reducing means which reduces plural laser beams adjusted in terms of a beam interval by the pitch changing means and modulated in terms of an amount of light by the direct modulation and plural laser beams modulated in terms of an amount of light by the audio-optical modulation element to the same pitch simultaneously.

In the aforesaid structure, laser beams modulated by the audio-optical modulation element (AOM) and laser beams modulated directly both of which are changed to be of the same beam interval are collectively reduced to the same pitch and are caused to scan a recording medium for exposure.

Item 9

The laser exposure unit structured so that the number of mirrors interposed in an optical path of a laser beam with a longer wavelength is less than that of mirrors interposed in an optical path of a laser beam with a shorter wavelength.

In the aforesaid structure, in the case of a laser beam having a longer wavelength, a recording medium is exposed to light through less mirrors compared with the occasion of other laser beams having shorter wavelengths. The mirrors mentioned above are optical mirrors which require assembling and adjustment, and laser beams having a longer wavelength require less mirrors requiring the assembling and adjustment than other laser beams having a shorter wavelength do. For example, when using an infrared wavelength as a long wavelength, the laser beams having an infrared wavelength which are hard to see require less mirrors which require adjustment.

The structures of Items 1 and 2 offer an effect that it is possible to avoid a light source which is large in size and high in cost and to use a recording medium (light-sensitive material) which is easily manufactured and preserved and is low in cost, by using a laser beam modulated directly and a laser beam modulated in terms of an amount of light by an audio-optical modulation element in combination.

The structure of Item 3 offers an effect that a difference of a beam form between a semiconductor laser and a gas laser or between a semiconductor laser and a solid laser can be corrected and all beams are made to be the same in a form to be caused to scan for exposure.

The structure of Item 4 offers an effect that it is possible to improve a response of an audio-optical modulation element by reducing a diameter of a beam entering the audio-optical modulation element.

The structure of Item 5 offers an effect that it is possible to scan for exposure by synchronizing exposure timing even if there is a delay in modulation in terms of an amount of light made by an audio-optical modulation element for the laser beam modulated directly.

The structure of Item 6 offers an effect that it is possible to scan for exposure with a constant beam diameter even when a distance from a recording surface to an optical head varies, by projecting a laser beam on a recording medium as a collimated beam.

The structure of Item 7 offers an effect that a precision of superposition of each wavelength is improved when an interval of a laser beam modulated directly is made to be the same as that of a beam in the audio-optical modulation element in the structure where the audio-optical modulation element which modulates plural laser beams simultaneously is used.

The structure of Item 8 offers an effect that resolution and the number of lines can easily be changed because intervals of beams for various wavelengths are made to be the same in advance as stated above and they are reduced collectively.

The structure of Item 9 offers an effect that it is possible to reduce the number of optical mirrors requiring adjustment related to a laser beam having the wavelength that is hard to see, and thereby to assemble and adjust easily.

The second object of the invention can be attained by the following preferable structures of Items 10–20.

Item 10

An image recording apparatus having therein a light source section wherein plural laser diodes are arranged, a beam arranging optical system which arranges laser beams emitted from the plural laser diodes on the recording surface of a recording material in the sub-scanning direction, a moving means which moves the laser beams emitted from the plural laser diodes and the recording material relatively in the main scanning direction, a measuring means which measures beam intensity of each of the laser beams emitted from the plural laser diodes, and a laser diode control means which controls each of the plural laser diodes so that beam intensity of each laser beam may become the same as others, in accordance with beam intensity of each laser beam measured by the measuring means stated above, wherein a filter adjustment means which shifts with a filter the exposure intensity of all laser beams emitted from the plural laser diodes.

In the structure of Item 10, occasional making all laser beams to be of the same intensity is conducted by controlling an electric current which flows through each of plural laser diodes, which results in accurate adjustment, while frequent shifting of beam intensity of all laser beams emitted from plural laser diodes is conducted by a filter, which results in simple adjustment.

Item 11

The image recording apparatus stated above wherein the filter adjustment means shifts exposure intensity of all laser beams emitted from the plural laser diodes when plural filters each having different density are selectively interposed in or removed from an optical path of a laser beam.

In the structure of Item 11, frequent shifting of beam intensity of all laser beams emitted from plural laser diodes can be conducted on plural steps.

Item 12

The image recording apparatus stated above wherein the filter adjustment means has an optical wedge filter, and exposure intensity of all laser beams emitted from the plural laser diodes can be shifted by changing a beam incident position on the optical wedge filter.

In the structure of Item 12, the filter adjustment means which is small in size and simple in structure makes it possible to conduct frequent shifting of beam intensity of all laser beams emitted from plural laser diodes on plural steps or continuously.

Item 13

The image recording apparatus stated above wherein the optical wedge filter is a disk-shaped optical wedge filter, and laser beams emitted from the plural laser diodes are caused to enter the disk-shaped optical wedge filter so that a beam incident position on the disk-shaped optical wedge filter may be in the direction of the same radius of the disk-shaped optical wedge filter.

In the structure of Item 13, beam intensity of each of laser beams emitted from plural laser diodes can be shifted by the same amount accurately.

Item 14

The image recording apparatus stated above wherein there is provided a beam converging means which converges incident positions on the aforesaid filter for all laser beams emitted from the plural laser diodes mostly to one point.

In the structure of Item 14, degree of freedom for the positional relation between a laser beam and a filter is increased, and lack of uniformity of a filter does not affect, whereby beam intensity in each of laser beams emitted from plural laser diodes can be shifted by the same amount accurately even when a filter which varies its density depending on its position like an optical wedge filter is used.

Item 15

An image recording apparatus having therein a light source section wherein plural laser diodes are arranged, a beam arranging optical system which arranges laser beams emitted from the plural laser diodes on the recording surface of a recording material in the sub-scanning direction, a moving means which moves the laser beams emitted from the plural laser diodes and the recording material relatively in the main scanning direction, a measuring means which measures beam intensity of each of the laser beams emitted from the plural laser diodes, and a laser diode control means which controls each of the plural laser diodes so that beam intensity of each laser beam may become the same as others, in accordance with beam intensity of each laser beam measured by the measuring means stated above, wherein a polarizer adjustment means which shifts with a polarizer the exposure intensity of all laser beams emitted from the plural laser diodes is provided.

In the structure of Item 15, occasional making all laser beams to be of the same intensity is conducted by controlling an electric current which flows through each of plural laser diodes, which results in accurate adjustment, while frequent shifting of beam intensity of all laser beams emitted from plural laser diodes is conducted by a polarizer, which results in simple adjustment.

Item 16

The image recording apparatus stated above wherein there is provided a beam converging means which converges incident positions on the aforesaid polarizer for all laser beams emitted from the plural laser diodes mostly to one point.

In the structure of Item 16, degree of freedom for the positional relation between a laser beam and a polarizer is increased, and lack of uniformity of a polarizer does not affect, whereby beam intensity in each of laser beams emitted from plural laser diodes can be shifted by the same amount accurately.

Item 17

An image recording apparatus having therein a light source section wherein plural laser diodes are arranged, a beam lining up optical system which lines up laser beams emitted from the plural laser diodes on the recording surface of a recording material in the sub-scanning direction, a moving means which moves the laser beams emitted from the plural laser diodes and the recording material relatively in the main scanning direction, a measuring means which measures beam intensity of each of the laser beams emitted from the plural laser diodes, and a laser diode control means which controls each of the plural laser diodes in accordance with beam intensity of each laser beam measured by the measuring means stated above, wherein a photoreceptor element capable of moving relatively to the position where a laser beam emerging from the beam lining up optical system can be received receives each laser beam emitted from each of the plural laser diodes and emerging from the beam lining up optical system, whereby the measuring means measures beam intensity of each laser beam emitted from each of the plural laser diodes.

In the structure of Item 17, variation of beam intensity of each laser beam including variation of beam intensity caused not only by variation of luminescence intensity of a laser beam with the passage of time but also by a change in an optical axis is made to be corrected satisfactorily.

Item 18

The image recording apparatus stated above wherein the photoreceptor element is made to be movable relatively to a recording surface of the recording material on which the laser beam records.

In the structure of Item 18, beam intensity of each laser beam on the recording surface of the recording material can be detected directly, and thereby variation of the beam intensity of each laser beam can well be corrected.

Item 19

An image recording apparatus having therein a light source section wherein plural laser diodes are lined up, a beam arranging optical system which lines up laser beams emitted from the plural laser diodes on the recording surface of a recording material in the sub-scanning direction, and a moving means which moves the laser beams emitted from the plural laser diodes and the recording material relatively in the main scanning direction, wherein a luminescence timing control means which delays luminescence timing of each laser diode of the plural laser diodes individually is provided.

In the structure of Item 19, it is possible to delay luminescence timing of each laser diode individually even when a precision of mounting each laser diode is not so high as a recording position of each laser beam of the plural laser diodes on the recording surface of a recording material shifts in the sub-scanning direction. Therefore, it is possible to correct properly the effect of deviation of the recording position of a laser beam emitted from each laser diode in the main scanning direction resulted from deviation of an optical axis caused by environmental conditions or the passage of time, and it is possible to record satisfactorily.

Item 20

The image recording apparatus having therein a recording position detector which can move relatively to the recording surface of the recording material for the laser beam and detects the recording position for each laser beam emitted from the plural laser diodes, wherein the luminescence timing control means delays luminescence timing of each laser diode individually for each laser diode of the plural laser diodes in accordance with the recording position of a laser beam emitted from each laser diode detected by the recording position detector.

In the structure of Item 20, a recording position of a laser beam emitted from each laser diode is automatically measured, and an amount of delay of luminescence timing of each laser diode is determined and controlled in accordance with the measured recording position of the laser beam emitted from each laser diode. Therefore, an effect of the deviation of the recording position of the laser beam emitted from each laser diode in the main scanning direction resulted from deviation of an optical axis caused by environmental conditions and the passage of time can properly be corrected automatically, and thereby less time is required for maintaining quality of recorded images, resulting in satisfactory recording.

DETAILED DESCRIPTION OF THE PREFERRED EMBODIMENT

Embodiments of the invention will be explained as follows.

Figure 1:
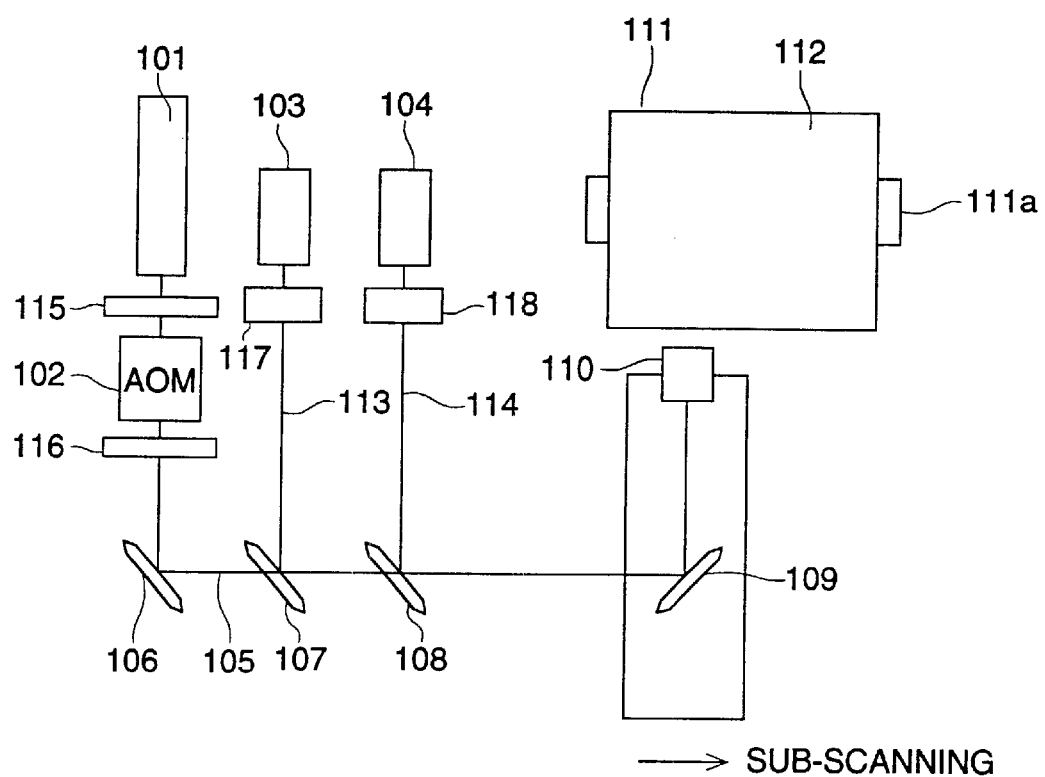
FIG. 1 is a system structure diagram showing an outline of a laser exposure unit in the present embodiment which attains the first object of the invention.

FIG. 1 is a system structure diagram showing an outline of a laser exposure unit in the present embodiment, in which three laser beams each having a different wavelength are used to obtain color images by scanning a light-sensitive material (recording medium) for exposure.

"Recording medium" in the invention means a medium on which an image such as a latent image or a visible image is formed when a laser beam is projected on the medium. It includes a light-sensitive medium sensitive to a laser beam, a medium on which a printing plate is formed through abrasion when a laser beam is projected on the medium, and other mediums.

Figure 2:
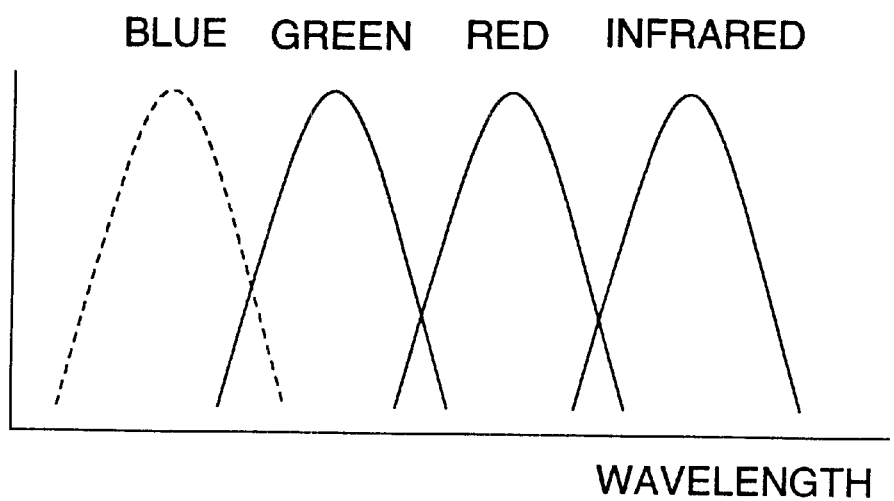
FIG. 2 is a diagram showing each wavelength of a laser beam in the present embodiment.

To be concrete, as shown in FIG. 2, laser beams covering three wavelengths of green G, red R and infrared IR are used in the structure to expose C, M and Y layers of a light-sensitive material serving as a recording medium. In other words, one of B, G and R light-sensitive layers is made to be a light-sensitive material sensitive to infrared light, and a light source is shifted to infrared.

In the structure, a He—Ne laser which is a gas laser is used as a laser for green G, while a semiconductor laser (LD) is used as a laser for red R and infrared IR.

A semiconductor laser is usually smaller in size and lower in cost than a gas laser. Therefore, if it is possible to employ an arrangement wherein a semiconductor laser can be used for all of three wavelengths, an exposure system can be reduced remarkably in size and cost. In this case, however, due to the restriction of an oscillation wavelength of the semiconductor laser, all of three layers for C, M and Y require a light-sensitive material which is sensitive to red wavelength or longer wavelength, and a light-sensitive material having such characteristics is hard to be manufactured and preserved and is high in cost. Therefore, it is arranged to use a He—Ne laser as a laser for green G and to use a light-sensitive material which is sensitive to green wavelength or longer wavelength, without using an Ar laser which is commonly used as a laser for blue B but is large in size and high in cost, so that the cost and size of the exposure system can be reduced.

Incidentally, it is also possible to employ the structure wherein a solid laser, especially, an LD exciting solid laser which generates green light through SHG (second harmonic generation) is used as a laser for green G in place of a He—Ne laser which is a gas laser.

Now, details of a laser exposure unit shown in FIG. 1 will be explained.

A laser exposure unit shown in FIG. 1 is one wherein a He—Ne laser is used as a laser for green G as stated above, while a semiconductor laser (LD) is used as a laser for red R and infrared IR.

A laser beam (green laser beam) emitted from He—Ne laser 101 serving as a laser for green G is modulated in terms of an amount of light by audio-optical modulation element (audio-optic modulator: hereinafter referred to as AOM) 102 in accordance with modulation signals (image signals), and semiconductor lasers (LD) 103 and 104 are modulated in terms of an amount of light by direct modulation (internal modulation) in accordance with modulation signals (image signals) as lasers for red G and infrared IR.

"Direct modulation" is a method to control directly an amount of light of an emitted laser by changing an electric current to be inputted into a laser, which is different from a method to control an amount of light indirectly with an audio-optical modulation element provided outside a laser.

Laser beam 105 modulated in terms of an amount of light by the AOM 102 is reflected on reflection mirror 106, then passes through two dichroic mirror 107 and 108 and then is reflected on reflection mirror 109 to be projected on light-sensitive material (recording medium) 112 fixed on rotary drum 111 through image-forming lens 110.

Laser beam (red laser beam) 113 emitted from semiconductor laser 103 is reflected on the dichroic mirror 107, then passes through the dichroic mirror 108 to be reflected on the reflection mirror 109, and is projected on the light-sensitive material (recording medium) 112 fixed on rotary drum 111 through image-forming lens 110.

Further, laser beam (infrared laser beam) 114 emitted from semiconductor laser 104 is reflected on the dichroic mirror 108, then is reflected on the reflection mirror 109 and is projected on the light-sensitive material (recording medium) 112 fixed on rotary drum 111 through the image-forming lens 110.

As stated above, it is so arranged that the number of mirrors interposed in an optical path for infrared laser beam 114 is the smallest, compared with other laser beams for two wavelengths. Due to this, the number of mirrors requiring mirror adjustment is less for the infrared laser beam 114 representing a long wavelength laser which is hardest to see, which makes it easy to assemble and to adjust.

The rotary drum 111 is arranged to be driven to rotate on its rotary shaft 111a. Due to this, primary scanning is carried out, and an optical head provided with the reflection mirror 109 and image-forming lens 110 is moved in the direction parallel with the rotary shaft 111a so that sub-scanning is carried out.

Between the AOM 102 and He—Ne laser 101, there is provided cylindrical lens 115 (incident beam diameter reducing means) for reducing the beam diameter of laser beam 105 which enters the AOM 102, while between the AOM 102 and reflection mirror 106, there is provided cylindrical lens 116 (beam diameter restoring means) for restoring the beam diameter reduced by the cylindrical lens 115 to its original diameter.

With regard to an example of a definition of a laser beam diameter to be described, the laser beam diameter is defined to be a width which is located at the position corresponding to 13.5% of the amount of light in light amount distribution represented by Gaussian distribution and is measured with an measuring instrument called a beam scan or a beam profiler (Type 2180, made by Phuton). A form of a laser beam is controlled so that a dot form obtained when a light-sensitive material is exposed to each laser beam may be the same as the standard dot form, and accuracy of the control varies depending on sensitivity and sharpness of the light-sensitive material. It is preferable for the form of a laser beam that its beam diameter is within ±50% of the standard beam diameter.

Since response of the AOM is lowered when a diameter of a beam entering the AOM is large, it is arranged so that response of the AOM may be improved by reducing the diameter of laser beam 105 entering the AOM by means of the cylindrical lens 115. It is also arranged so that the reduced diameter is restored by cylindrical lens 116 after the laser beam 105 is subjected to modulation in terms of an amount of light by the AOM 102.

A beam form of laser beam 105 emitted from He—Ne laser 101 is completely round almost, while that of laser beams 113 and 114 emitted from semiconductor lasers (LD) 103 and 104 is elliptical. It is therefore arranged so that the elliptical laser beams 113 and 114 are changed to be complete round which is a beam form of laser beam 105 by cylindrical lenses (or prism pair) 117 and 118 serving as a beam form forming means. Due to this, laser beams for three wavelengths are all used to scan for exposure in a form of complete round.

Figure 3:
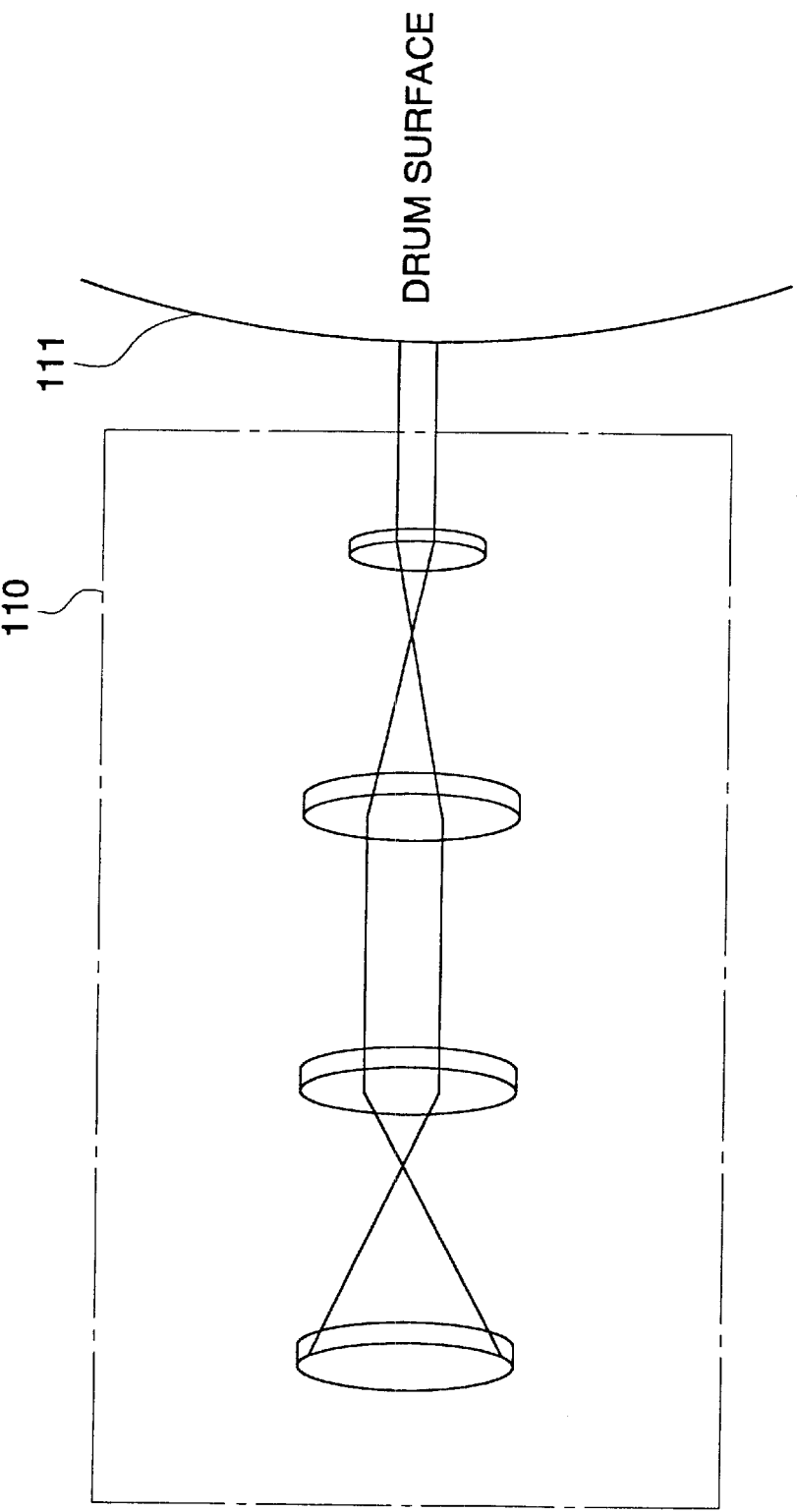
FIG. 3 is a diagram showing an image forming lens system in the present embodiment.
Figure 4:
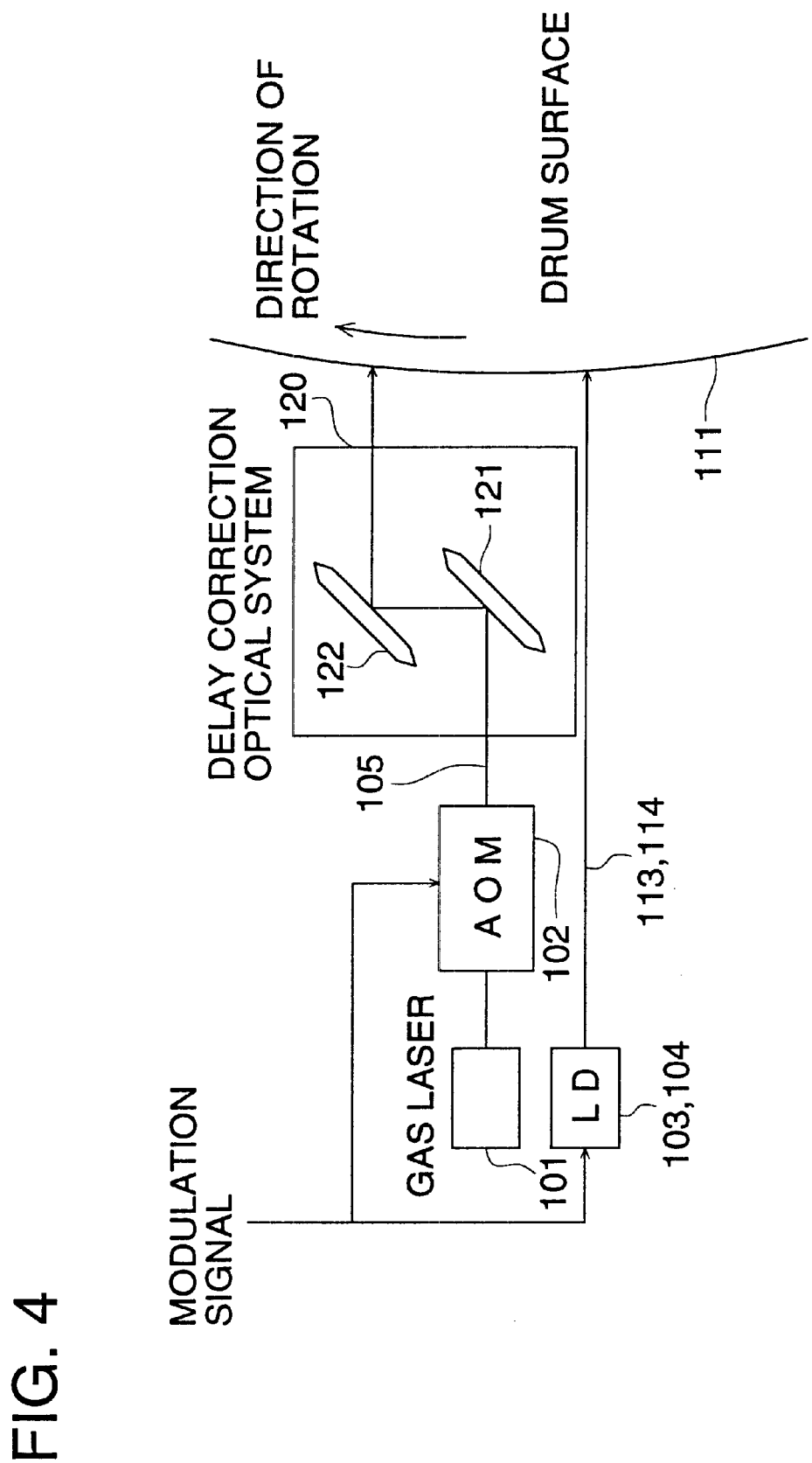
FIG. 4 is a system structure diagram showing the structure for correcting optically the delay in response of AOM.

The image-forming lens 110 (reducing optical means) is arranged as shown in FIG. 3.

As shown in FIG. 3, in the image-forming lens 110, laser beams 105, 113 and 114 (parallel beams) for three wavelengths are projected on light-sensitive material 112. With this structure using image-forming lens 110, a diameter of a laser beam used to expose light-sensitive material 112 is not changed even when a distance between image-forming lens 110 (optical head) and the recording surface is varied by eccentricity of rotary drum 111.

There is a difference of response speed between modulation by the AOM 102 and direct modulation by semiconductor lasers 103 and 104, and the direct response is quicker. Therefore, if modulation signals of the same timing are given to both AOM 102 and semiconductor lasers 103 and 104 without changing the structure shown in FIG. 1, beams to be projected on the same point on the drum surface are dispersed.

It is therefore preferable to provide delay correction optical system 120 (exposure timing adjustment means) by which the laser beam 105 emitted from He—Ne laser 101 modulated by AOM 102 exposes the position which is ahead, in the rotational direction of the drum, of the point to be exposed by laser beams 113 and 114 emitted respectively from semiconductor lasers (LD) 103 and 104.

The delay correction optical system 120 is composed of two reflection mirrors 121 and 122 arranged to be parallel with each other, and it shifts laser beam 105 from AOM 102 in the main scanning direction.

Under the condition that the delay correction optical system 120 stated above is provided, the portion exposed by semiconductor lasers (LD) 103 and 104 is exposed by He—Ne laser 101 with a time lag, and eventually, the He—Ne laser 101 and the semiconductor lasers (LD) 103 and 104 can be superposed on the recording surface to expose it even if response in modulation by AOM 102 is slower than direct modulation by the semiconductor lasers (LD) 103 and 104.

Incidentally, it is also possible to employ the structure wherein a beam position of the laser beams 113 and 114 emitted from the semiconductor lasers (LD) 103 and 104 is shifted in the direction opposite to the rotational direction of the drum in place of shifting optically the laser beam 105 emitted from He—Ne laser 101. Namely, the structure wherein the laser beam 105 emitted from the He—Ne laser 101 exposes with a time lag in the main scanning direction equivalent to response delay of the AOM 102 is acceptable.

Though response delay of the AOM 102 is corrected optically in the structure mentioned above, it is also possible to cope with the response delay by correcting delay of modulation data (image data).

Figure 5:
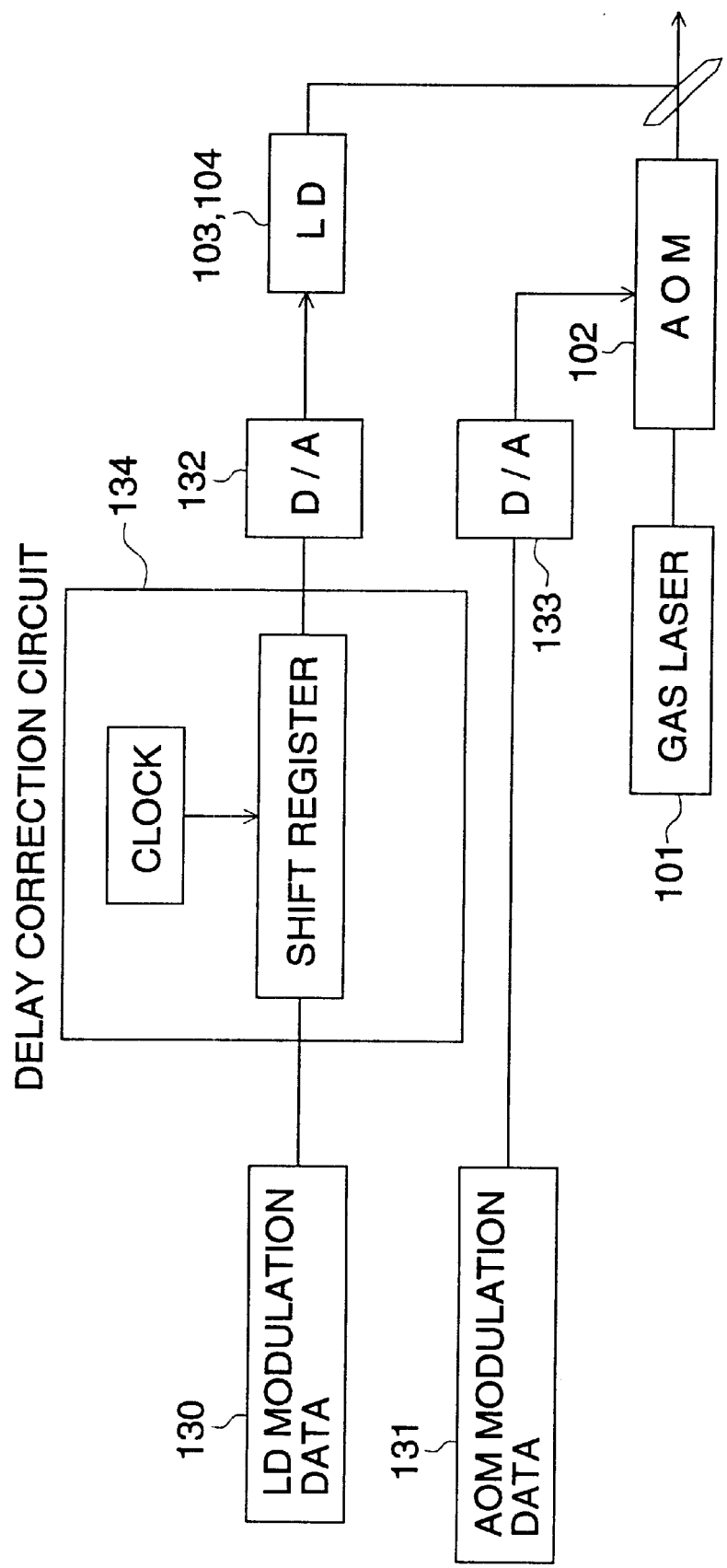
FIG. 5 is a system structure diagram showing the structure for correcting the delay in response of AOM by delay of modulated data.

In the example shown in FIG. 5, LD modulation data 130 and AOM modulation data 131 are subjected to D/A conversion respectively by D/A converters 132 and 133, and are given respectively to semiconductor lasers (LD) 103 and 104, in which, however, the LD modulation data 130 is delayed by delay correction circuit 134 (exposure timing adjustment means) by an amount of the response delay of the AOM 102.

In the structure mentioned above, though the semiconductor lasers 103 and 104 are modulated directly in accordance with delayed modulation data, laser beams modulated by modulation data of the same timing conduct exposure at the step when laser beams modulated in terms of an amount of light are emitted from AOM 102, because there is a delay in modulation in terms of an amount of light by AOM 102 based on preceding modulation data.

In the structure of the embodiment stated above, one laser beam is used to scan for exposure for each wavelength. However, it is also possible to employ the structure wherein plural laser beams are used to scan for exposure for each wavelength as shown in FIG. 6.

Figure 6:
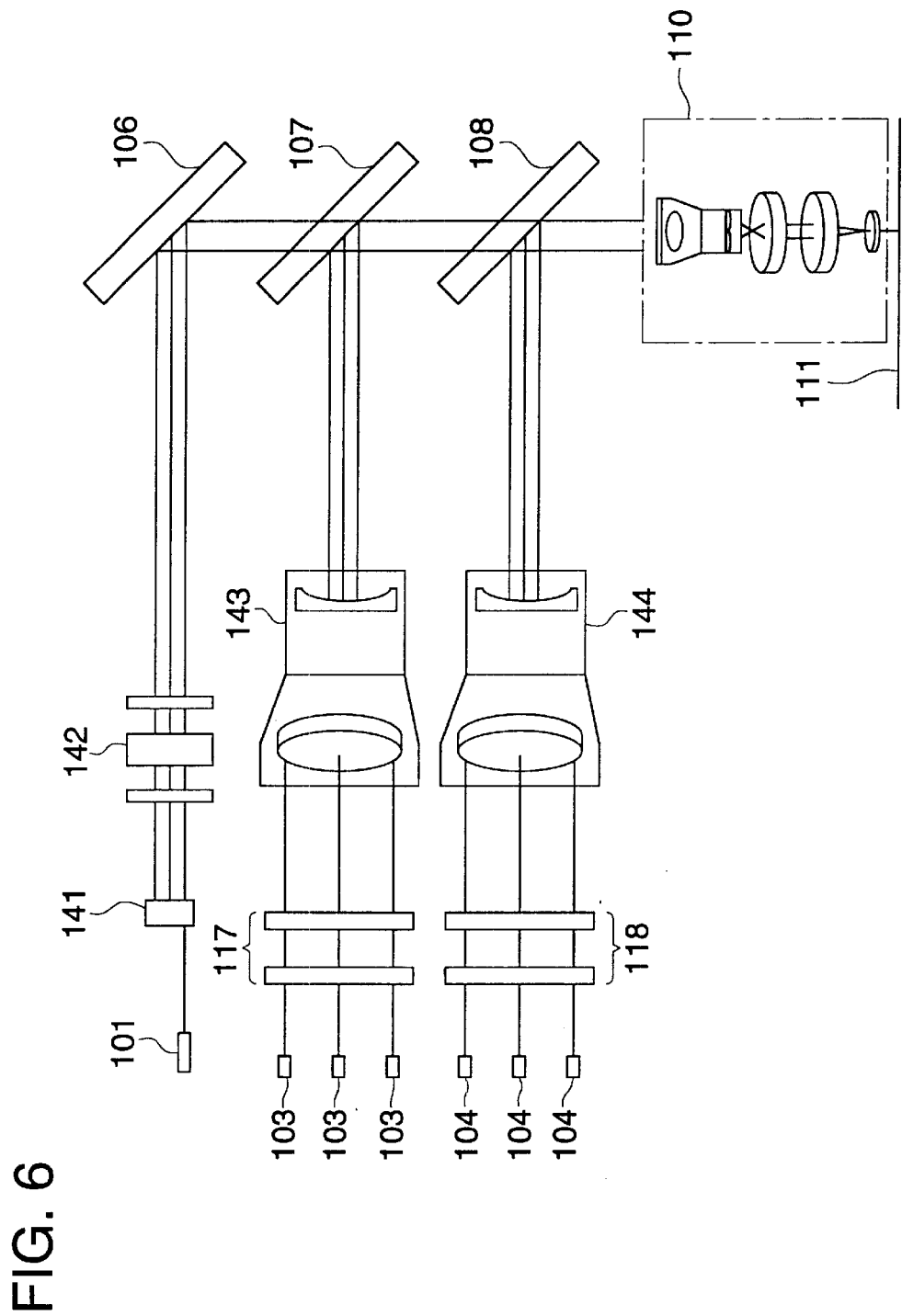
FIG. 6 is a system structure diagram showing an embodiment for exposure wherein plural beans are used for each wavelength.

In the example shown in FIG. 6, there is shown an occasion where three laser beams are used to scan for exposure for each wavelength. However, the number of beams for each wavelength is not limited to three in the invention.

In FIG. 6, green laser beam 1-5 emitted from He—Ne laser 101 is modulated in terms of an amount of light by multiple AOM 142 after being divided by beam separator 141 into three beams which are then reflected on reflection mirror 106 and are caused to enter image forming lens 110 through dichroic mirrors 107 and 108.

Even in this case, cylindrical lenses 115 and 116 are arranged on both sides of the multiple AOM 142 so that a diameter of the beam is reduced before the beam enters the multiple AOM 142 to improve the response of the multiple AOM 142, and then the beam diameter is restored to its original diameter after the beam is subjected to modulation in terms of an amount of light by the multiple AOM 142.

On the other hand, three semiconductor lasers (LD) 103 for red R and three semiconductor lasers (LD) 104 for infrared IR are provided. Beams for each wavelength are formed in terms of a beam form to be complete round which is a beam form of He—Ne laser 101 by cylindrical lenses (or prism pair) 117 and 118, and they enter beam compressors 143 and 144.

In the beam compressors 143 and 144 (pitch changing means), a beam distance (pitch between beams) of three red laser beams and that of three infrared laser beams are reduced so that the beam distance agrees with that of the multiple AOM 142.

Three red laser beams and three infrared laser beams both having the reduced beam distance are reflected on dichroic mirrors 107 and 108, and enter image forming lens 110.

At the image forming lens 110, laser beams for each wavelength which have been arranged to be of the same beam distance are reduced in terms of beam distance collectively and simultaneously to be of the same beam distance (pitch reducing means), and each laser beam is projected on the recording surface as a parallel beam.

Incidentally, a cylinder exposure system to expose from its inside is used as an exposure system in the embodiment stated above, but the invention is not limited to this, and a polygon mirror, for example, can also be used for scanning.

Nest, structures attaining the second object of the invention will be explained as follows.

Figure 7:
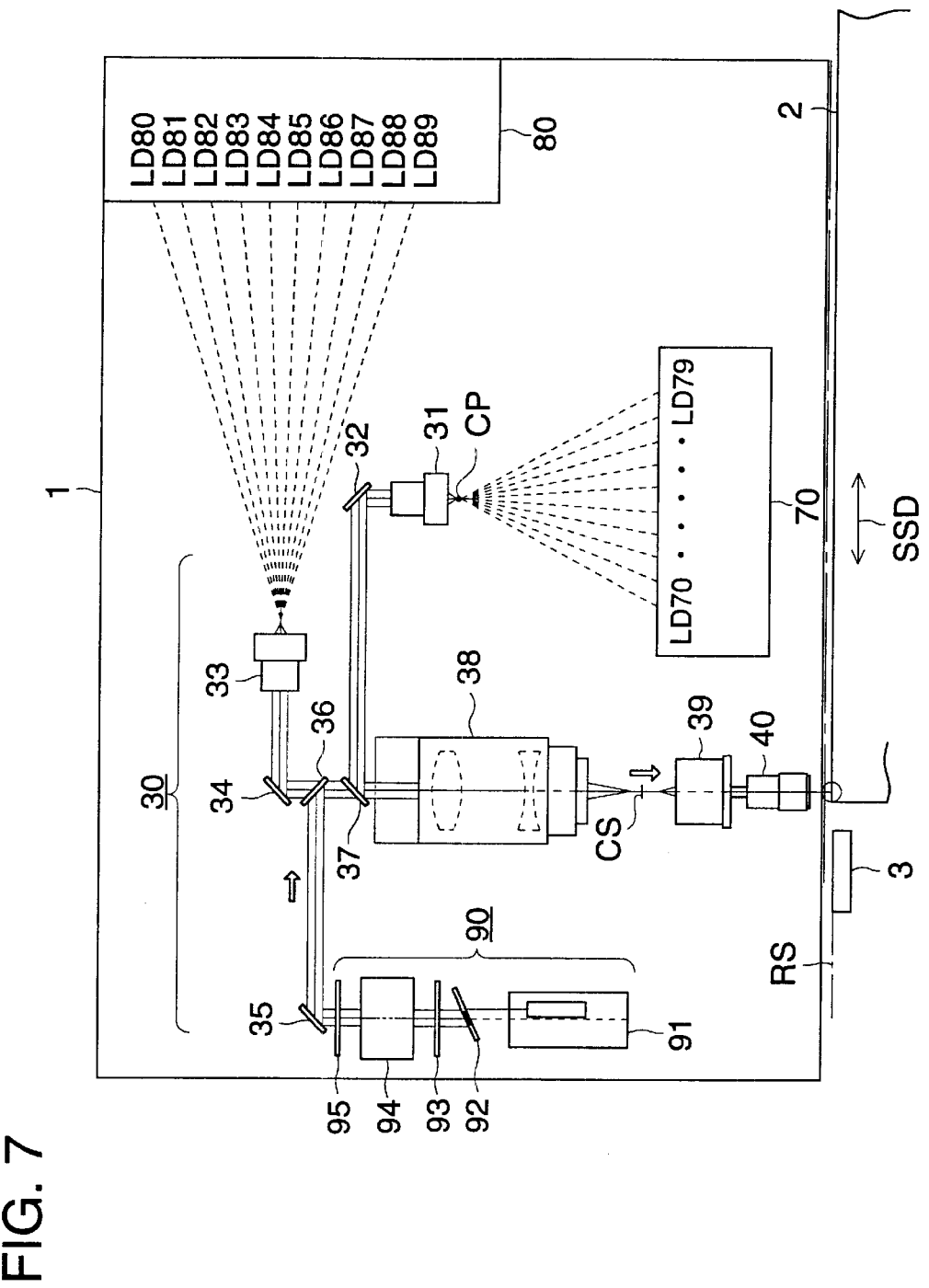
FIG. 7 is a schematic structure diagram of an image recording apparatus in the embodiment for attaining the second object of the invention.

An image recording apparatus shown in FIG. 7 is an apparatus wherein a latent image is recorded on a photographic paper which is a silver halide color photographic light-sensitive material provided thereon with light-sensitive layers sensitive respectively to green light, red light and infrared light, and plural (for example, 10) laser beams are generated simultaneously for each of green light, red light and infrared light, and are arranged to line up in the sub-scanning direction MSD for irradiation on the photographic paper which moves in the main scanning direction to record a latent image on the photographic paper. The image recording apparatus shown in FIG. 7 is that shown in FIG. 6 which is further embodied, and the image recording apparatus shown in FIG. 7 can attain the first object of the invention stated previously.

In FIG. 7, optical unit 1 is provided with infrared light source section 70 wherein plural laser diodes emitting infrared light are provided to line up, red light source section 80 wherein plural laser diodes emitting red light are provided to line up, green light source section 90 which has He—Ne laser 91 emitting green light and emits plural laser beams, and beam lining up optical system 30 which lines up in the sub-scanning direction SSD plural laser beams emitted from plural laser diodes of the infrared light source section 70, plural laser beams emitted from plural laser diodes of the red light source section 80, and plural laser beams emitted from green light source section 90 on the recording surface of a photographic film for plate making use wound around drum 2.

The drum 2 is one around which a photographic film for plate making use is wound to be fixed, and it is rotated at a constant speed when recording images so that plural laser beams emitted from the infrared light source section 70, plural laser beams emitted from the red light source section 80, and plural laser beams emitted from the green light source section 90 are moved relatively to a photographic film for plate making use in the main scanning direction MSD.

Optical unit 1 can move in the sub-scanning direction SSD, and when the optical unit 1 moves in the sub-scanning direction SSD relatively to the drum 2, latent images are recorded on the entire surface of a photographic film for plate making use which is wound around the drum 2 to be fixed thereon.

Photoreceptor element 3 is provided on a plane which is on the same level as the surface for recording by the aforesaid laser beams on a photographic film for plate making use. In the arrangement wherein the optical unit 1 moves in the sub-scanning direction SSD, and the aforesaid laser beams enter the photoreceptor element 3, beam intensity of each of plural laser beams emitted from the infrared light source section 70, plural laser beams emitted from the red light source section 80, and plural laser beams emitted from the green light source section 90 is measured by the photoreceptor element 3.

Figure 8:
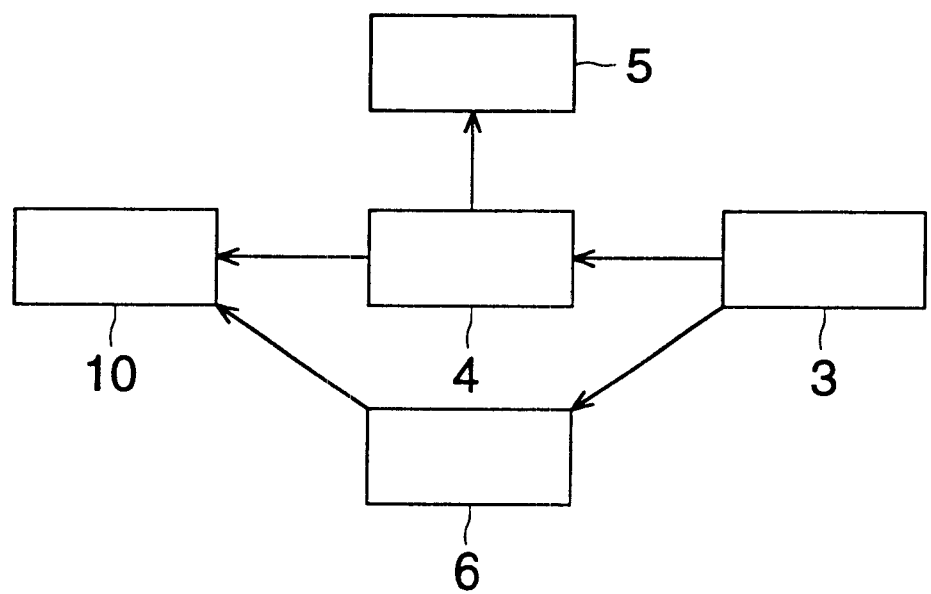
FIG. 8 is a block diagram of the image recording apparatus in FIG. 7.

In accordance with the beam intensity measured by the photoreceptor element 3 in each laser beam emitted from the infrared light source section 70, laser diode control section 4 shown in FIG. 8 which is a block diagram of an image recording apparatus in the present embodiment controls each laser diode of plural laser diodes of the infrared light source section 70 so that beam intensity of each laser beam may be the same, and it controls each laser diode of plural laser diodes of the red light source section 80 so that beam intensity of each laser beam may be the same. Incidentally, this control is not conducted on the green light source section 90 because of its structure wherein plural laser beams each having the same amount of light are emitted from one He—Ne laser.

Incidentally, on the infrared light source section 70, plural laser diodes LD 70–LD 79 are provided to line up at prescribed intervals. The plural laser diodes LD 70–LD 79 are arranged in a way that laser beams emitted from the laser diodes are all directed to central point CP which is on this side of lens 31.

In the green light source section 90, a laser beam of 544 nm is emitted from He—Ne laser 91 to enter beam separator 92. The laser beam entering the beam separator 92 is divided by the beam separator 92 into plural laser beams each being reduced in terms of a beam diameter by cylindrical lens 93 (for better response of audio-optical element 94). Then, plural laser beams are caused to enter audio-optical element 94. Then, the audio-optical element 94 is driven and controls ON and OFF of each laser beam based on image signals inputted in the green light source section 90. The laser beam of ON passes through cylindrical lens 95 to be restored to its original beam diameter, and emits plural laser beams.

Beam lining up optical system 30 includes the following items. Lens 31 collimates plural laser beams emitted from plural laser diodes LD 70–LD 79 of the infrared light source section 70 to be in parallel with each other. Mirror 32 reflects the plural laser beams collimated by the lens 31 at a right angle, and further, dichroic mirror 37 reflects these plural laser beams at a right angle to cause them enter converging lens group 38. Lens 33 collimates plural laser beams emitted from plural laser diodes LD 80–8D 79 of the red light source section 80 to be in parallel with each other. Mirror 34 reflects the plural laser beams collimated by the lens 33 at a right angle to cause them enter the converging lens group 38 through dichroic mirrors 36 and 37. Plural laser beams emitted from the green light source section 90 are reflected on dichroic mirror 35 at a right angle and then are reflected on the dichroic mirror 36 at a right angle to enter the converging lens group 38 through the dichroic mirrors 37.

The converging lens group 38 converges these laser beams entered thereinto to one point on adjustment plane CS. Then, the plural laser beams having passed the adjustment plane CS enter reducing optical lens group 39. Then, these laser beams having entered the reducing optical lens group 39 are reduced by the reducing optical lens group 39 to be formed on the recording surface RS on the recording material wound around the drum 2 as an image. Then, plural laser beams coming out of the reducing optical lens group 39 are further converged by image-forming lens 40 to be aligned with the desired beam diameter and beam pitch which are shown in FIG. 9.

Figure 9:
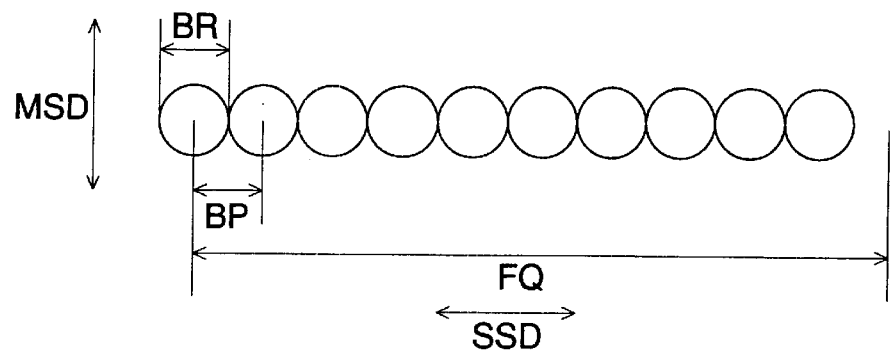
FIG. 9 is a diagram viewed from the front side of recording surface RS.

FIG. 9 is a diagram in which the recording surface RS is viewed from the front side, in which plural laser beams emitted from the red light source section 70, plural laser beams emitted from the infrared light source section 80, and plural laser beams emitted from the green light source section 90 are overlapped each other, and plural laser beams each having a beam diameter of BR in the sub-scanning direction SSD are lined up in the sub-scanning direction SSD at beam pitch BP, so that a latent image is formed on a recording material. When optical unit 1 moves by prescribed movement amount FQ (=10×BP) against drum 2 in the sub-scanning direction SSD while the drum 2 makes one turn, latent images are recorded evenly on the entire surface of a photographic film for plate making use wound around the drum 2 to be fixed thereon. Incidentally, the beam diameter BR and beam pitch BP are in order of 1–100 μm.

Exposure adjustment section 5 is provided in the vicinity of adjustment surface CS.

Next, there will be explained an operation wherein laser diode control section 4 controls each laser diode of plural laser diodes of both infrared light source section 70 and red light source section 80 so that beam intensity of each laser beam may be the same in accordance with beam intensity of each laser beam measured by photoreceptor element 3, and an exposure intensity adjustment amount is obtained in accordance with beam intensity of each laser beam measured by the photoreceptor element 3 and with sensitivity of a recording material wound around drum 2 to be fixed thereon, and exposure intensity of all laser beams emitted from the infrared light source section 70, the red light source section 80 and green light source section 90 are shifted in accordance with the obtained exposure intensity adjustment amount.

First, when the beam intensity of each green laser beam measured by the photoreceptor element 3 is not the same, beam separator 92 is subjected to adjustment which is continued until the measure beam intensity of each green laser beam proves to be the same. An arithmetic mean of the beam intensity of each green laser beam which has become the same is assumed to be MBIG. On the laser diode control section 4, there are established in advance green standard beam intensity SBIG representing the standard beam intensity of green laser beams, red standard beam intensity SBIR representing the standard beam intensity of red laser beams, and infrared standard beam intensity SBIIR representing the standard beam intensity of infrared laser beams, Beam intensity of laser beams respectively for infrared and red measured by the photoreceptor element 3 are assumed to be BI 70–BI 79 and BI 80–BI 89, and an arithmetic mean of these beam intensity MBIIR and MBIR are obtained respectively for infrared and red. Then, from the arithmetic mean of these beam intensity MBIG, MBIR, and MBIIR and from green standard beam intensity SBIG, red standard beam intensity SBIR and infrared standard beam intensity SBIIR, there are obtained through the following expressions exposure intensity adjustment amount correction amount ΔRPI, green target beam intensity TBIG, red target beam intensity TBIR, and infrared target beam intensity TBIIR $$\Delta RPI = 2 \times \log_2(MBIG/SBIG)$$

$$TBIG = MBIG$$

$$TBIR = SBIR \times \sqrt{2}^{\Delta\Delta RPI}$$

$$TBIIR = SBIIR \times \sqrt{2}^{\Delta\Delta RPI}$$

Then, an electric current flowing through each laser diode is changed and adjusted in accordance with a ratio of the measured beam intensity of each red laser beam BI 80–BI 89 to the red target beam intensity TBIR, then plural laser diodes LD 80–LD 89 are caused again to emit laser beams, and beam intensity BI 80–BI 89 of laser beams emitted from plural laser diodes LD 80–LD 89 are repeatedly measured by the photoreceptor element 3, thus values I 80–I 89 of an electric current flowing through laser diodes LD 80–LD 89 are obtained to be established so that beam intensity of laser beams BI 80–BI 89 may become the same as red target beam intensity TBIR.

Further, in the same way, an electric current flowing through each laser diode is changed and adjusted in accordance with a ratio of the measured beam intensity of infrared laser beams BI 70–BI 79 to the infrared target beam intensity TBIIR, then plural laser diodes LD 70–LD 79 are caused again to emit laser beams, and beam intensity BI 70–BI 79 of each laser beam emitted from plural laser diodes LD 70–LD 79 are repeatedly measured by the photoreceptor element 3, thus values I 70–I 79 of an electric current flowing through laser diodes LD 70–LD 79 are obtained to be established so that beam intensity of laser beams BI 70–BI 79 may become the same as infrared target beam intensity TBIIR.

On the laser diode control section 4, there is established in advance film type exposure intensity adjustment amount KRPI specific to each of plural types of recording material on which a latent image can be recorded by an image recording apparatus in the present embodiment. The laser diode control section 4 reads film type exposure intensity adjustment amount KRPI based on the type of a photographic paper on which a latent image is recorded. Then, the laser diode control section 4 obtains exposure intensity adjustment amount RPI by adding exposure intensity adjustment correction amount ΔRPI to film type exposure intensity adjustment amount KRPI.

RPI=KRPI+ΔRPI

The laser diode control section 4 transmits exposure intensity adjustment amount RPI thus obtained to exposure intensity adjustment section 5 with numerical data of a binary number.

Figure 10:
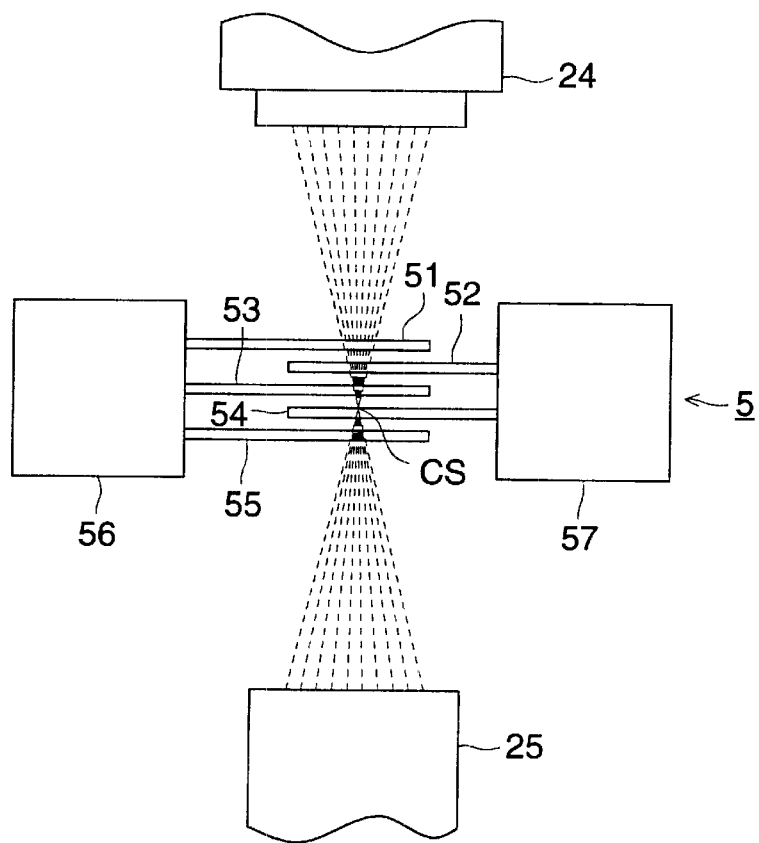
FIG. 10 is a schematic diagram of the vicinity of exposure intensity adjustment section 5.

FIG. 10 shows a schematic diagram of the vicinity of the exposure intensity adjustment section 5. In the exposure intensity adjustment section 5, plural ND filters 51–55 each having different density are provided in a laser beam optical path in a way that they can be interposed or removed by filter driving sections 56 and 57.

The exposure intensity adjustment section 5 controls that filters 51–55 are interposed into or removed from a laser beam optical path, in accordance with the transmitted exposure intensity adjustment amount RPI. Namely, when a figure in the first position which is the lowest position of the exposure intensity adjustment amount RPI is "1", filter 55 is interposed into the laser beam optical path, while when it is "0", filter 55 is not interposed into the laser beam optical path. When a figure in the second position of the exposure intensity adjustment amount RPI is "1", filter 54 is interposed into the laser beam optical path, while when it is "0", filter 54 is not interposed into the laser beam optical path. When a figure in the third position of the exposure intensity adjustment amount RPI is "1", filter 53 is interposed into the laser beam optical path, while when it is "0", filter 53 is not interposed into the laser beam optical path. When a figure in the fourth position of the exposure intensity adjustment amount RPI is "1", filter 52 is interposed into the laser beam optical path, while when it is "0", filter 52 is not interposed into the laser beam optical path. When a figure in the fifth position of the exposure intensity adjustment amount RPI is "1", filter 51 is interposed into the laser beam optical path, while when it is "0", filter 51 is not interposed into the laser beam optical path.

Due to the foregoing, uniforming the intensity of each laser beam which takes place at low frequency can be carried out through accurate adjustment by controlling an electric current flowing through each laser diode of plural laser diodes LD 70–LD 79, while shifting beam intensities of all laser beams emitted from plural laser diodes LD 70–LD 79 which takes place at high frequency can be carried out through simple adjustment. It is further possible to shift beam intensities of all laser beams emitted from plural laser diodes LD 70–LD 79 to plural steps, because exposure intensities of all laser beams emitted from plural laser diodes LD 70–LD 79 are shifted by interposing plural filters 51–55 selectively into or removing them from a laser beam optical path.

Further, a degree of freedom of positional relation between a laser beam and filters 51–55 is increased, and it is possible to shift beam intensity of each laser beam emitted from plural laser diodes LD 70–LD 79 without being affected by unevenness of filters 51–55, because all laser beams emitted from plural laser diodes LD 70–LD 79 are converged to one point approximately by converging lens group 24, and plural filters 51–55 each having different density are interposed in the vicinity of the converged point or removed therefrom.

In addition, a photoreceptor element which can move relatively to the surface for laser beam recording on a photographic film for plate making use receives each laser beam emitted from plural laser diodes LD 70–LD 79, and measures beam intensities BI 7–BI 79 of laser beams emitted from plural laser diodes LD 70–LD 79. Therefore, it is possible to correct properly not only fluctuations of luminous intensities of laser diodes LD 70–LD 79 caused by the passage of time but also fluctuations of beam intensities BI 70–BI 79 of laser beams including fluctuations of beam intensities caused by deviated optical axis and others.

Next, another example of the exposure intensity adjustment section will be explained.

Figure 11:
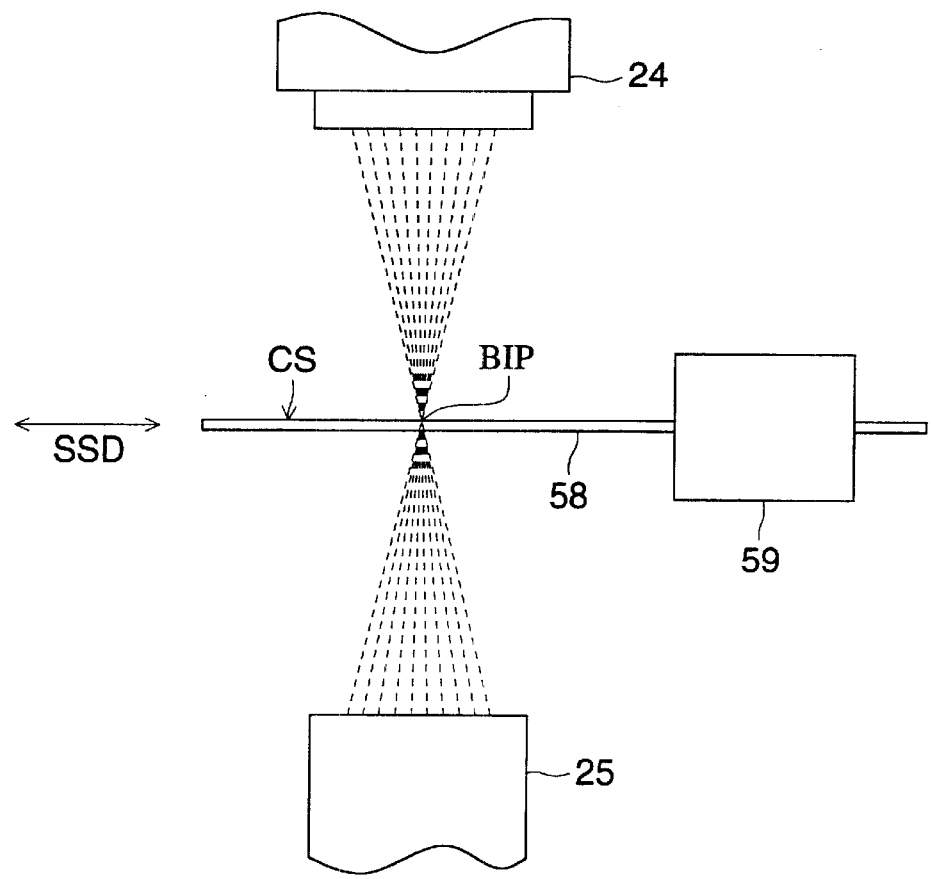
FIG. 11 is a diagram viewed from the front side of recording surface RS in another example.

Exposure intensity adjustment section 5 shown in FIG. 11 has therein optical wedge filter 58 whose density increases continuously in proportion to the distance in the sub-scanning direction SSD. This optical wedge filter 58 is supported so that it can be moved on adjustment surface CS in the sub-scanning direction SSD by filter driving member 59, and a position for a beam to enter the optical wedge filter 58 is adjusted by driving the optical wedge filter 58 in accordance with an exposure intensity adjustment amount inputted in exposure intensity adjustment section 5 so that a portion with density on the optical wedge filter 58 corresponding to that exposure intensity adjustment amount represents the position for the beam to enter the optical wedge filter 58. Due to this, the exposure intensity adjustment section 5 can conduct continuous shifting of beam intensities of all laser beams emitted from plural laser diodes which is conducted frequently.

"Optical wedge" in the this embodiment means a concept including "optical wedge" described in "Dictionary of Terminology for Photography" compiled by the Commission of Photography Terminology in Japan Society of Photography, and it is a plate-shaped light-absorbing object which is made to change optical density stepwise or continuously for distances in the prescribed direction. Therefore, a material therefor does not need to be one whose light absorption does not vary regardless of a wavelength. Incidentally, the prescribed direction in this case may be either the rotational direction or the linear direction, or even other directions.

Figure 12:
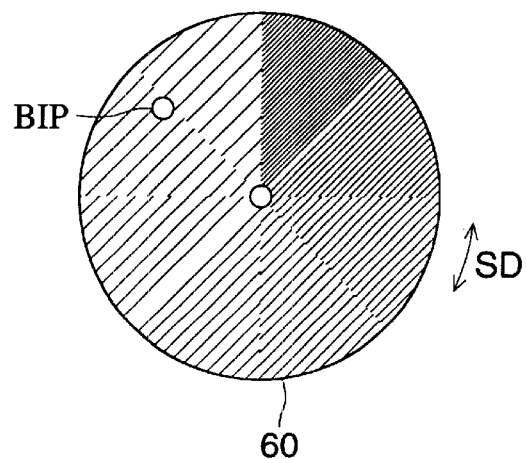
FIG. 12 is a schematic diagram of the vicinity of exposure intensity adjustment section 5.
Figure 13:
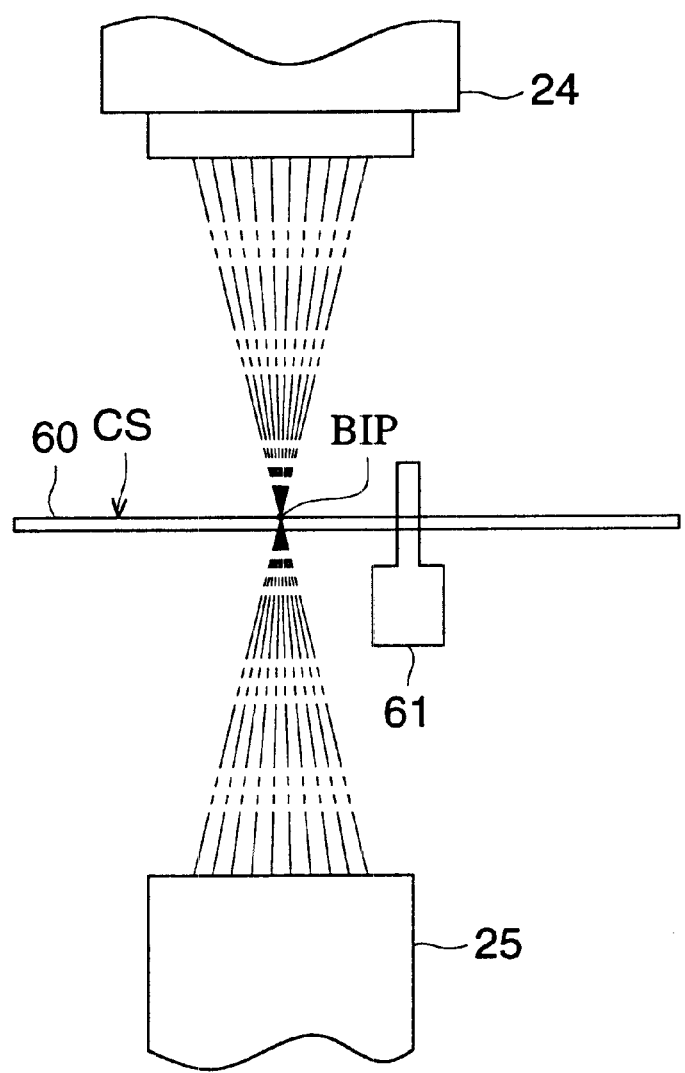
FIG. 13 is a diagram viewed from the part of converging lens group 24 of disk-shaped optical wedge filter 60 of an image recording apparatus.

FIG. 12 is a diagram viewed from the part of converging lens group 24 of disk-shaped optical wedge filter 60 of an image recording apparatus. FIG. 13 is a schematic structure diagram of the vicinity of exposure intensity adjustment section 5 wherein the disk-shaped optical wedge filter 60 is used. The disk-shaped optical wedge filter 60 is an optical wedge filter whose density increases continuously (stepwise in FIG. 12 due to lack of power of expression for light and shade caused by application filed through electric signals) in proportion of an rotation angle in the rotary direction SD. This optical wedge filter 60 is supported so that it can be rotated by filter driving member 61 in the rotary direction SD on adjustment surface CS, and position BIP for a beam to enter the disk-shaped optical wedge filter 60 is adjusted by driving the disk-shaped optical wedge filter 60 in accordance with an exposure intensity adjustment amount inputted in exposure intensity adjustment section 5 so that a portion with density on the disk-shaped optical wedge filter 60 corresponding to that exposure intensity adjustment amount represents the position BIP for the beam to enter the disk-shaped optical wedge filter 60. Due to this, the exposure intensity adjustment section 5 can conduct continuous shifting of beam intensities of all laser beams emitted from plural laser diodes which is conducted frequently.

The disk-shaped optical wedge filter 60 can be changed to a disk-shaped polarizing filter.

With regard to the disk-shaped polarizing filter, the direction of polarized light transmitted therethrough is changed in accordance with a rotation angle in the rotary direction SD. A laser beam is polarized light because it is coherent light. Plural laser diodes LD 70–LD 79 are arranged on light source section 10 in a way that all laser beams emitted from plural laser diodes LD 70–LD 79 provided on the light source section 70 may be made the same polarized light.

Therefore, position BIP for a beam to enter the diskshaped polarizing filter is adjusted by driving the diskshaped polarizing filter so that a rotation angle of the diskshaped polarizing filter agrees with the direction of the transmission factor corresponding to the exposure intensity adjustment amount, in accordance with the exposure intensity adjustment amount inputted in exposure intensity adjustment section 5. Due to this, the exposure intensity adjustment section 5 which is small in size and simple in structure can conduct continuous shifting of beam intensities of all laser beams emitted from plural laser diodes which is conducted frequently.

Next, an example wherein recording positions for plural laser beams are controlled will be described as follows.

The photoreceptor element 3 stated above can detect, like a two-dimensional CCD image-pickup element, two-dimensional distribution of an amount of light on the recording surface RS, and when it moves relatively to the recording surface RS of a photographic film for plate making use, it can detect a recording position of each laser beam emitted from plural laser diodes LD 70–LD 79.

Though it is preferable that recording positions of laser beams are lined up in a straight line in the sub-scanning direction as shown in FIG. 9, they are sometimes deviated in the main scanning direction despite an effect of line up offered by cylindrical lens 26.

Figure 14:
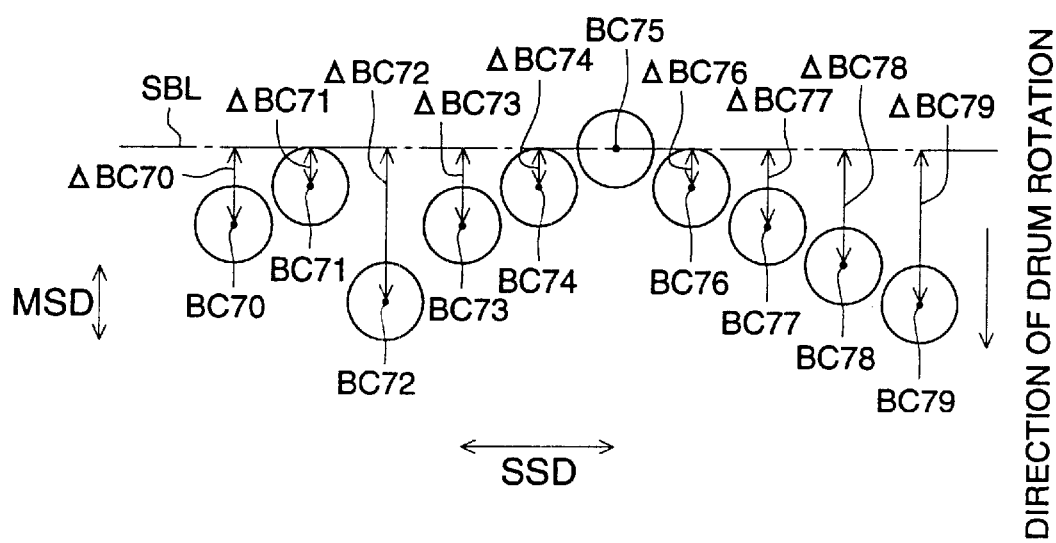
FIG. 14 is a schematic structure diagram of the vicinity of exposure intensity adjustment section 5.

The photoreceptor element 3 detects recording positions BC 70–BC 79 of laser beams emitted from plural laser diodes LD 70–LD 79, and transmits the detected recording positions BC 70–BC 79 to luminescence timing control section 6 shown in FIG. 8. The luminescence timing control section 6 establishes a straight line which is extended in the sub-scanning direction from the recording position (BC 75 in FIG. 14) which is at the uppermost stream side in the rotary direction of the drum among recording positions BC 70–BC 79 as a standard recording line SBL. Then, the luminescence timing control section 6 obtains deviation Δ BC 70–Δ BC 79 from the standard recording line SBL of recording positions BC 70–BC 79, and then obtains delay time TR 70–TR 79 respectively for plural laser diodes LD 70–LD 79 from the deviation Δ BC 70–Δ BC 79 and from peripheral velocity VD of drum 2, using the following expression.

Tri=ΔBCi/VD ("i" represents natural numbers of 70–79)

The luminescence timing control section 6 delays image signals inputted respectively in plural laser diodes LD 70–LD 79 respectively by delay time TR 70–TR 79, and put them in light source section 70. Due to this, the luminescence timing control section 6 delays luminescence timing of each laser diode individually in accordance with recording positions BC 70–BC 79 of laser beams emitted from laser diodes detected by the photoreceptor element 3.

Owing to the foregoing, recording positions BC 70–BC 79 of laser beams emitted from laser diodes are measured automatically even if mounting accuracy of laser diodes LD 70–LD 79 is not so high as recording positions BC 70–BC 79 on a recording material of laser beams emitted from laser diodes are deviated in the main scanning direction MSD, and delay time TR 70–TR 79 for luminescence timing of laser diodes are determined and controlled in accordance with measured recording positions BC 70–BC 79 of laser beams emitted from laser diodes. Therefore, luminescence timing of each laser diode can individually be delayed automatically, and an effect of deviation of recording positions BC 70–BC 79 of laser beams emitted from laser diodes in the main scanning direction MSD caused by a shifted optical axis or others caused by environmental conditions and the passage of time can be corrected properly, requiring less time for maintaining quality of recorded images, which makes it possible to record satisfactorily. Incidentally, the control stated above can also be applied to a green laser beam and a red laser beam in the same way.

An effect of deviation of the recording position of the laser beam emitted from each laser diode in the main scanning direction caused by optical axis deviation resulted from an influence of environment and the passage of time is made to be corrected satisfactorily for excellent recording, even when accuracy of installation of each laser diode is not high enough to allow the position on a recording material for each laser beam of plural laser diode to record to be deviated in the main scanning direction.

This method of controlling the light emission timing is also applicable to the laser beam exposing timing among different colors such as a red laser beam and a green laser beam.

Next, another example of an image recording apparatus will be explained.

Figure 15:
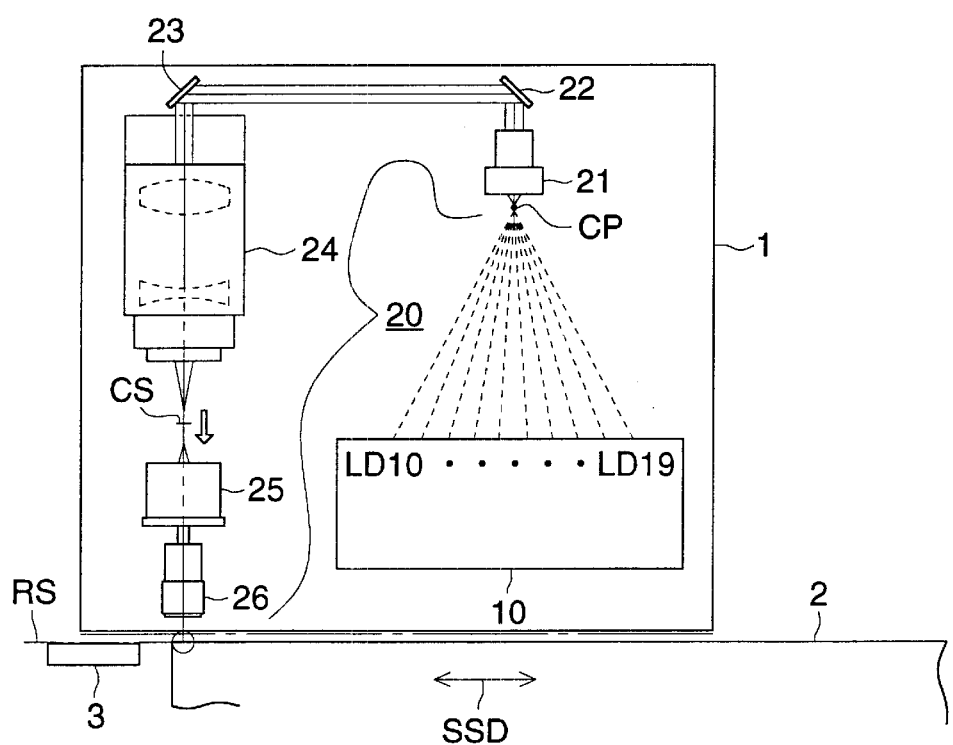
FIG. 15 is a schematic structure diagram of an image recording apparatus in another embodiment.

An image recording apparatus shown in FIG. 15 is an apparatus which records a latent image on a photographic film for plate making use representing a silver halide monochromatic photographic light-sensitive material on which a light-sensitive layer sensitive to red light is provided. in which a latent image is recorded on a photographic paper when plural red laser beams are generated simultaneously, and are lined up in the sub-scanning direction SSD on the photographic paper moving in the main scanning direction.

On optical unit 1, there are provided light source section 10 on which plural (for example, 10) laser diodes are provided to be lined up and beam lining up optical system 20 which lines up plural laser beams emitted from plural laser diodes of the light source section 10 on the recording surface of a photographic film for plate making use wound around drum 2 in the sub-scanning direction SSD.

The drum 2 is one around which a photographic film for plate making use is wound to be fixed thereon, and it rotates at constant speed when recording images, so that plural laser beams emitted from plural laser diodes LD 10–LD 19 and the photographic film for plate making use may be moved relatively in the main scanning direction.

The optical unit 1 can move in the sub-scanning direction SSD, and when this optical unit 1 moves in the sub-scanning direction SSD relatively to the drum 2, latent images are recorded on the entire surface of the photographic film for plate making use wound around the drum 2 to be fixed thereon.

The photoreceptor element 3 is provided on the plane which is on the same level as the recording surface for plural laser beams on a photographic film for plate making use. When the optical unit 1 moves in the sub-scanning direction SSD so that plural laser beams enter the photoreceptor element 3, beam intensities of laser beams emitted from plural laser diodes of light source section 10 and emerging from beam lining up optical system 20 are measured by the photoreceptor element 3. Owing to this structure, it is possible to conduct control related to plural laser beams identical to the image recording apparatus shown in FIG. 7.

The invention stated above it is possible to conduct in a short period of time, simply and stably the shifting of exposure intensities for all laser beams emitted from plural laser diodes which is required by a change of tone reproduction of outputted images and a change of recording materials, these changes being needed to be made frequently.

Fluctuations of beam intensities of laser beams including not only fluctuations of luminescence intensities of laser diodes caused by the passage of time but also fluctuations of beam intensities caused by changes in an optical axis can be corrected properly.

Even if mounting accuracy of laser diodes is not so high as positions of recording by laser beams emitted from plural laser diodes on a recording material are deviated in the main scanning direction, an effect of deviation of recording positions of laser beams emitted from laser diodes in the main scanning direction caused by a shifted optical axis or others caused by environmental conditions and the passage of time can be corrected properly, and it is possible to record satisfactorily.

What is claimed is:

1. An exposing apparatus for exposing a color light sensitive material, comprising:
    a first laser beam source including one of a gas laser and a solid laser, the first laser beam source emitting a first laser beam having a first wavelength corresponding to green light;
    an audio-optical modulation element for modulating the first laser beam in terms of light amount;
    a second laser beam source including a laser diode which is directly modulated in terms of light amount, the second laser beam source emitting a second laser beam having a second wavelength corresponding to red light; and
    a third laser beam source including a laser diode which is directly modulated in terms of light amount, the third laser beam source emitting a third laser beam having a third wavelength corresponding to infrared light.

2. The exposing apparatus of claim 1, further comprising a beam shaping device for conforming a shape of the second laser beam and a shape of the third laser beam with a shape of the first laser beam.

3. The exposing apparatus of claim 1, further comprising:
    a beam diameter reducing device for reducing the diameter of the first laser beam emitted from the first laser beam source before the first laser beam enters the audio-optical modulation element, and
    a beam diameter enlarging device for enlarging the diameter of the first laser beam after the first laser beam exits from the audio-optical modulation element.

4. The exposing apparatus of claim 1, further comprising an exposing timing adjusting device for adjusting one of timing to expose the color light sensitive material with the first laser beam and timing to expose the color light sensitive material with the second laser beam and the third laser beam.

5. The exposing apparatus of claim 4, wherein the exposing timing adjusting device conforms the timing to expose the color light sensitive material with the first laser beam with the timing to expose the color light sensitive material with the second laser beam and the third laser beam.

6. The exposing apparatus of claim 4, wherein the exposing timing adjusting device adjusts the timings such that the exposure by the first laser beam, the exposure by the second laser beam and the exposure by the third laser beam form the same pixel.

7. The exposing apparatus of claim 4, wherein the exposing timing adjusting device is a device to delay the timing to emit the second laser beam and the third laser beam.

8. The exposing apparatus of claim 4, further comprising:
   a plurality of second laser beam sources;
   a plurality of third laser beam sources; and
   a position detecting device for detecting exposing positions on the color light sensitive material by the plurality of the second laser beam sources and the plurality of the third laser beam sources;
   wherein the exposing timing adjusting device adjusts exposing timing in accordance with the exposing positions detected by the position detecting device.

9. The exposing apparatus of claim 8, wherein the plurality of second laser beam sources and the plurality of third laser beam sources are respectively aligned along a scanning line,
   wherein the exposing apparatus further comprises a shifting device to shift the color light sensitive material in a shifting direction which is perpendicular relative to the scanning line; and
   wherein the position detecting device detects the position in the shifting direction on the color light sensitive material shifted by the sifting device.

10. The exposing apparatus of claim 8, wherein the position detecting device detects the exposing position from images formed on the color light sensitive material by the second laser beams emitted from the plurality of second laser beam sources and the third laser beams emitted from the plurality of third laser beam sources.

11. The exposing apparatus of claim 1, further comprising:
    a beam shaping device for reducing the diameter of the first laser beam emitted from the first laser beam source and the diameter of the second laser beam emitted from the second laser beam source, and for forming the first laser beam and the second laser beam as parallel beams.

12. The exposing apparatus of claim 11, wherein the beam shaping device is used for both of the first laser beam emitted from the first laser beam source and the second laser beam emitted from the second laser beam source.

13. The exposing apparatus of claim 1, further comprising:
    a beam splitter to split the first laser beam into a plurality of first laser beams;
    a plurality of second laser beam sources to emit a plurality of second laser beams;
    a plurality of third laser beam sources to emit a plurality of third laser beams;
    wherein the plurality of first laser beams emitted from the beam splitter are provided to the audio-optical modulation element; and
    a first pitch changing device for changing a pitch of the plurality of second laser beams and a pitch of the plurality third laser beams so that the pitch of the plurality of second laser beams and the plurality of third laser beams conform with the pitch of the first laser beams.

14. The exposing apparatus of claim 13, further comprising a second pitch changing device for simultaneously changing all of the pitch of the first laser beams, the pitch of the second laser beams and the pitch of the third laser beams.

15. The exposing apparatus of claim 1, further comprising:
    a first optical path changing device including mirrors and which bends the optical path of the first laser beam emitted from the first laser beam source;
    a second optical path changing device including mirrors and which bends the optical path of the second laser beam emitted from the second laser beam source;
    a third optical path changing device including mirrors and which bends the optical path of the third laser beam emitted from the third laser beam source;
    wherein a number of mirrors used in the third optical path changing device is smaller than a number of mirrors used in the first optical path changing device.

16. The exposing apparatus of claim 1, further comprising a filter provided in an optical path of the second laser beam and an optical path of the third laser beam so as to adjust a light intensity of each of the second laser beam and the third laser beam.

17. An apparatus for forming a color image on a silver halide color light sensitive material with a first color component signal, a second color component signal and a third color component signal for each pixel, the apparatus comprising:
    a first laser beam source including one of a gas laser and a solid laser, the first laser beam source emitting a first laser beam having a first wavelength corresponding to green light;
    an audio-optical modulation element for modulating the first laser beam in terms of light amount in response to the first color component signal;
    a second laser beam source including a laser diode which is directly modulated in terms of light amount in response to a second color component signal, the second laser beam source emitting a second laser beam having a second wavelength corresponding to red light;
    a third laser beam source including a laser diode which is directly modulated in terms of light amount in response to a third color component signal, the third laser beam source emitting a third laser beam having a third wavelength corresponding to infrared-light;
    an optical system having a focusing axis and receiving the first laser beam from the audio-optical modulation element, the second laser beam from the second laser beam source and the third laser beam from the third laser beam source, the optical system focusing the first laser beam, the second laser beam and the third laser beam along the focusing axis on the silver halide color light sensitive material;
    a conveyor which conveys the silver halide color light sensitive material relative to the optical system; and
    a controller which controls the first laser beam, the second laser beam and the third laser beam to be simultaneously focused along the focusing axis so that the first laser beam, the second laser beam and the third laser beam are superimposed so as to form the same pixel on the silver halide color light sensitive material.

18. The apparatus of claim 17, wherein the controller includes an optical timing adjusting member to adjust an optical path length of at least one of the first laser beam, the second laser beam and the third laser beam so that the optical system simultaneously focuses the first laser beam, the second laser beam and the third laser beam along the same focusing axis.

19. The apparatus of claim 18, wherein the controller controls at least one of an emission timing of the first laser beam source, an emission timing of the second laser beam source and an emission timing of the third laser beam source so that the optical system simultaneously focuses the first laser beam, the second laser beam and the third laser beam along the focusing axis.

20. An exposing apparatus, comprising:
a first laser beam source which emits a first laser beam having a first wavelength;
an audio-optical modulation element which modulates the first laser beam in terms of light amount;
a second laser beam source being directly modulated in terms of light amount and which emits a second laser beam having a second wavelength different from the first wavelength;
wherein the second laser beam emitted by the second laser beam source is not provided to the audio-optical modulation element, the first laser beam source is one of a gas laser and a solid laser, and the second laser beam source is a laser diode; and
wherein a recording medium is exposed with the first laser beam emitted from the first laser beam source and the second laser beam emitted from the second laser beam source,
wherein the exposing apparatus further comprises an exposing timing adjusting device for adjusting one of timing to expose the recording medium with the first laser beam emitted from the first laser beam source and timing to expose the recording medium with the second laser beam emitted from the second laser beam source,
wherein the exposing timing adjusting device conforms the timing to expose the recording medium with the second laser beam emitted from the second laser beam source with the timing to expose the recording medium with the first laser beam emitted from the first laser beam source,
wherein the exposing timing adjusting device delays the timing to emit the second laser beam from the second laser beam source; and
wherein the exposing apparatus further comprises:
a plurality of second laser beam sources; and
a position detecting device which detects exposing positions on the recording medium by the plurality of the second laser beam sources,
wherein the exposing timing adjusting device adjusts the exposing timing in accordance with the exposing positions detected by the position detecting means.

21. The exposing apparatus of claim 20, wherein the exposing timing adjusting device adjusts the timings such that exposure by the first laser beam emitted from the first laser beam source and exposure by the second laser beam emitted from the second laser beam source form the same pixel.

22. The exposing apparatus of claim 20, wherein the plurality of second laser beam sources are aligned along a scanning line, wherein the exposing apparatus includes a shifting device to shift the recording medium in a shifting direction which is perpendicular relative to the scanning line, and wherein the position detecting device detects the position in the shifting direction on the color light sensitive material shifted by the sifting device.

23. The exposing apparatus of claim 20, wherein the position detecting device detects the exposing position from images formed on the recording medium by the second laser beams emitted from the plurality of second laser beam sources.

24. An exposing apparatus, comprising:
a first laser beam source for emitting a first laser beam having a first wavelength;
an audio-optical modulation element for modulating the first laser beam in terms of light amount;
a second laser beam source being directly modulated in terms of light amount and emitting a second laser beam having a second wavelength different from the first wavelength;
wherein the second laser beam emitted by the second laser beam source is not provided to the audio-optical modulation element and the first laser beam source is one of a gas laser and a solid laser and the second laser beam source is a laser diode; and
wherein the exposing apparatus further comprises:
a plurality of the second laser beam sources emitting a plurality of second laser beams, wherein the plurality of second laser beams emitted from the plurality of second laser beam sources are not provided to the audio-optical modulation element; and
a first pitch changing device which changes a pitch of the plurality of second laser beams emitted from the plurality of the second laser beam sources so that the pitch of the plurality of second laser beams conforms with a pitch of the first laser beams.

25. The exposing apparatus of claim 24, further comprising:
a second pitch changing device which simultaneously changes both the pitch of the plurality of second laser beams emitted from the plurality of second laser beam sources and the pitch of the first laser beams emitted from the first laser beam source.

* * * * *